United States Patent [19]
Neuspiel

[11] Patent Number: 5,462,664
[45] Date of Patent: Oct. 31, 1995

[54] FILTER UNDERDRAIN MODULE AND UNDERDRAIN SYSTEM

[76] Inventor: Peter J. Neuspiel, 833 Surrey La., Media, Pa. 19063

[21] Appl. No.: 274,206

[22] Filed: Jul. 11, 1994

Related U.S. Application Data

[63] Continuation-in-part of Ser. No. 926,527, Aug. 5, 1992, abandoned.

[51] Int. Cl.$^6$ .................................................. B01D 24/46
[52] U.S. Cl. ........................... 210/274; 210/275; 210/293; 210/541
[58] Field of Search ..................... 210/274, 275, 210/293, 541

[56] References Cited

U.S. PATENT DOCUMENTS

| | | | |
|---|---|---|---|
| 3,110,667 | 11/1963 | Stuppy | 210/293 |
| 4,214,992 | 7/1980 | Sasano et al. | 210/274 |
| 4,331,542 | 5/1982 | Emrie | 210/274 |
| 4,923,606 | 5/1990 | Gresh et al. | 210/293 |
| 4,995,990 | 2/1991 | Weston | 210/793 |
| 5,068,034 | 11/1991 | Walter | 210/275 |
| 5,160,614 | 11/1992 | Brown | 210/275 |

*Primary Examiner*—Ivars Cintins
*Attorney, Agent, or Firm*—James W. Clement

[57] ABSTRACT

A filter underdrain module for an underdrain system for a granular media filter. The module is an elongated, integrally constructed, self-contained unit having an enclosed interior and having a substantially flat, substantially rectangular exterior top wall. The water and air for simultaneous backwashing and scouring the filter media are separately conveyed by conduits within the module, and separately discharged into the filter support bed or directly into the filter media, as the case may be. The discharge openings for the water and air are located in the top exterior wall of the module. The discharge openings for water are all substantially the same shape and size, and substantially uniformly spaced along the length and breadth of the module. The same is preferably true of the air discharge openings. Various preferred embodiments are disclosed, including dual ducts for one or both of the separate conduits for cleaning water and scouring air. An underdrain system using the module is disclosed. Various dimensional ratios for such a system are given, as well as various rectangular grid patterns for positioning the water and air discharge openings in the top wall of the module.

38 Claims, 7 Drawing Sheets

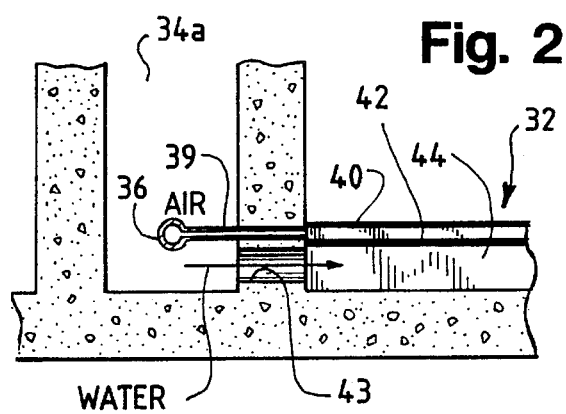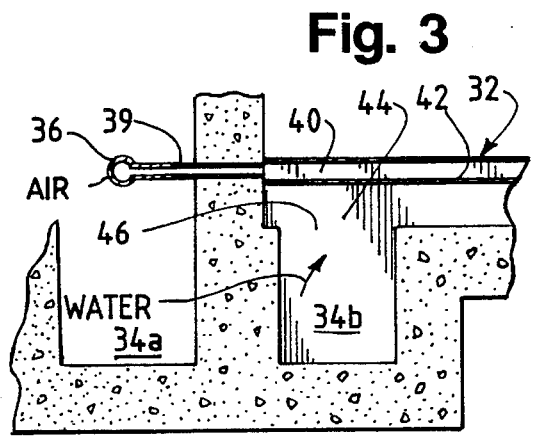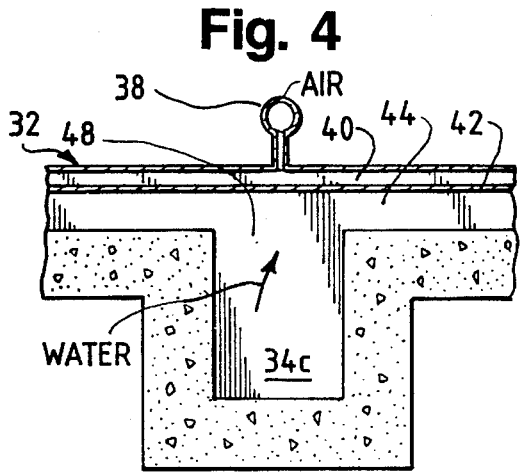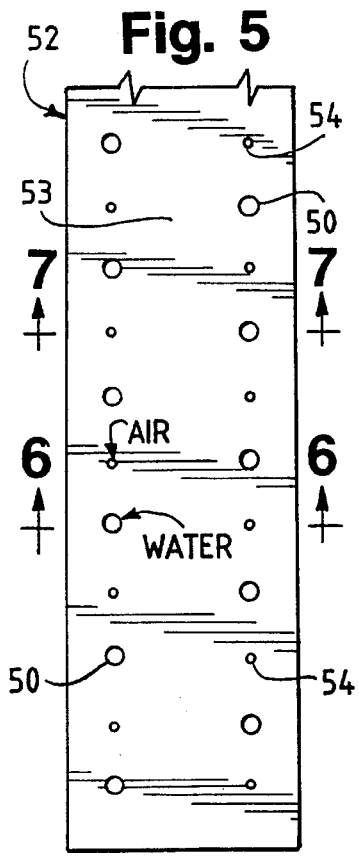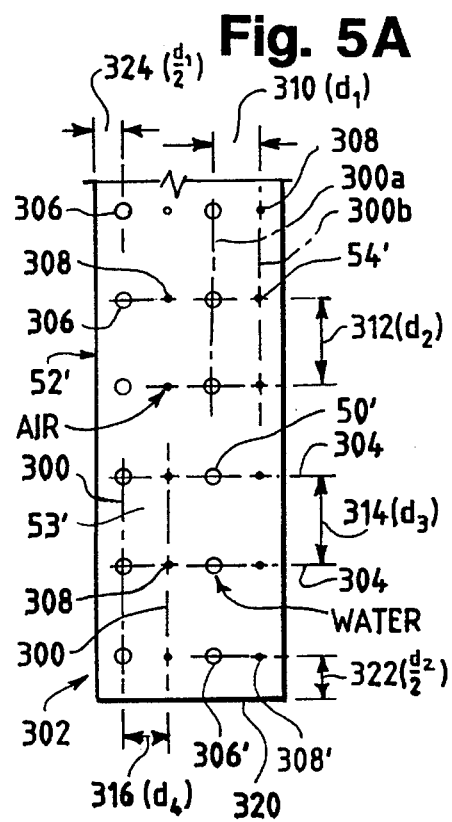

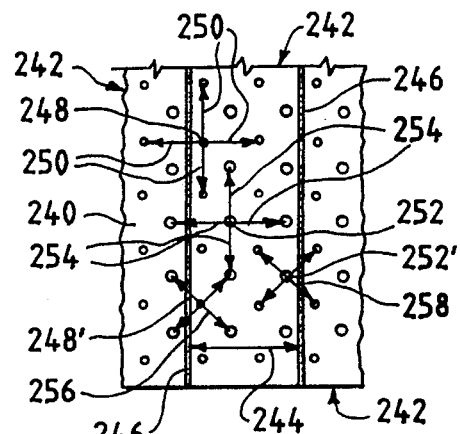
Fig. 10
Fig. 11
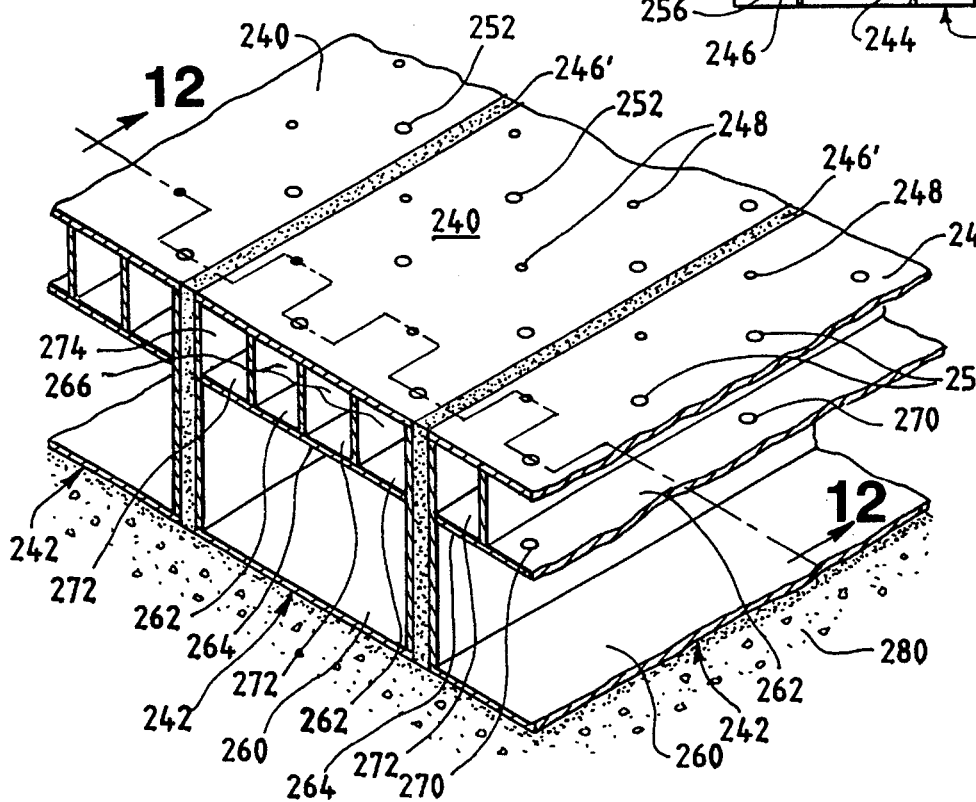
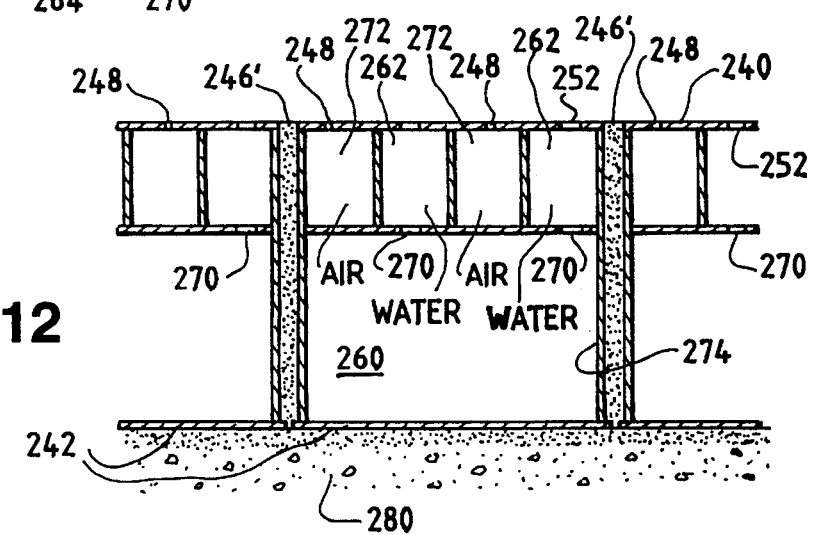
Fig. 12

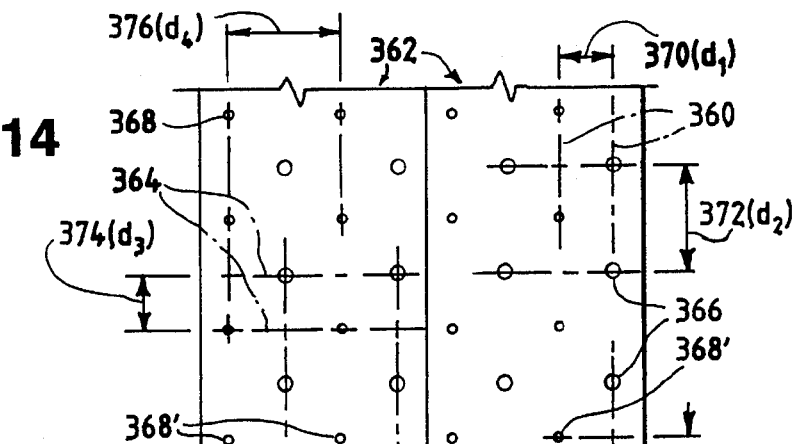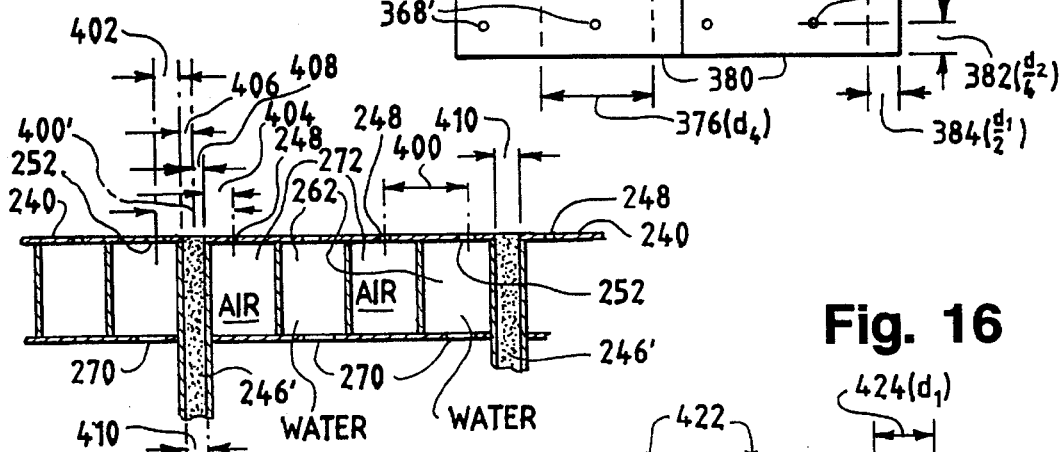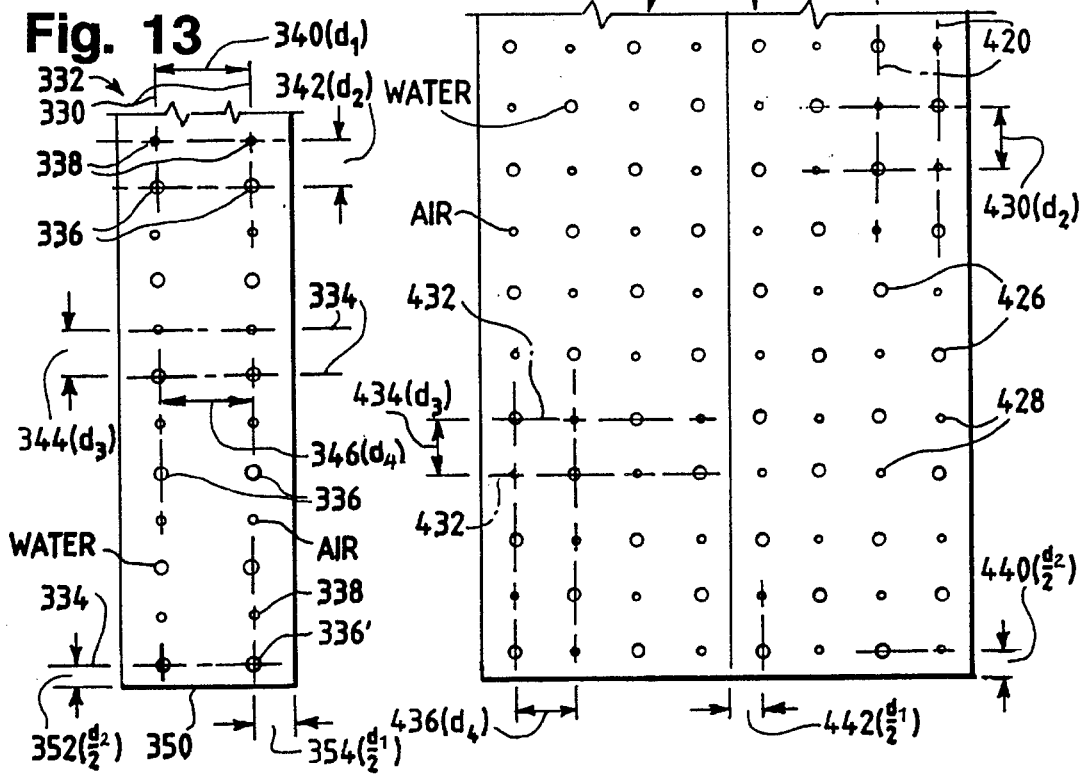

FILTER UNDERDRAIN MODULE AND UNDERDRAIN SYSTEM

This application is a continuation-in-part of U.S. application Ser. No. 07/926,527, filed Aug. 5, 1992, now abandoned.

FIELD OF THE INVENTION

This invention relates to a module for use in an underdrain system positioned below a filter bed, which bed removes particulate matter and other contaminants from a liquid that passes through the filter, and to an underdrain system comprised of such modules.

BACKGROUND OF THE INVENTION

Filters for the removal of solids and other contaminants contained in liquids, whether of the gravity, pressure or vacuum type, are generally comprised of granular filter media of various sizes. (Sometimes the filter media bed has only one filter medium, with all of the particles being of the same composition and substantially the same particle size, but by custom the material of which the bed is made is even in such a case referred to in the plural as the "filter media.") A liquid may be filtered by downward or upward flow through the filter media bed.

In the case of a downward flow filter, the liquid being filtered flows downwardly through the filter media bed and through the media support bed (if any), and exits the filtration tank through openings in an underdrain system. In the case of an upward flow filter, the unfiltered liquid enters the filtration tank through openings in an underdrain system, flows upwardly through the media support bed, if any, and through the media bed itself, with the filtered liquid exiting the filtration tank through collection troughs, or other collection devices, located above the media bed.

Whether a filter is of the downflow or upflow type, cleaning of the filter media (commonly referred to as "backwashing")—either by water alone, by air and water sequentially, or by air and water simultaneously—always involves an upward direction of flow.

The filter media usually comprise layers of granules of various sizes. In the case of a downflow filter the coarsest granules are at the top of the bed and the finest granules, commonly sand or garnet, are at the bottom. In an upflow filter the bed would normally consist of granules of one material, with the coarsest at the bottom and the finest at the top of the media bed.

Most often a media support bed, comprising graded layers of gravel or other suitable material, is provided to serve as a transition between the filter media bed and the underdrain system. The size of the gravel or other material comprising the support bed is larger than the size of the media granules at the interface between the support bed and the filter media bed. The main purpose of the media support bed is to provide a barrier against the possible migration of media particles into the underdrain system, and beyond.

A media support bed would not necessarily be required in a particular filter (1) if the smallest filter media particles in the filter are larger than the openings in the underdrain system that permit the discharge and upward flow of fluid to clean the filter bed, or (2) if the underdrain discharge openings are provided with some type of media retaining device such as, for example, media retaining nozzles or a mesh screen. However, if no gravel support bed is employed and the filter media bed is directly supported on top of the underdrain system, the discharge openings for the exit of washing water or scouring air into the filter media bed (or the openings in the mesh screen, as the case may be) must be extremely small to keep the smallest particles of the filter media out of the underdrain system, and the extremely small size of these openings frequently leads to plugging of the underdrain system. Thus it is generally desirable to provide a support bed of gravel or other suitable material, or some type of prefabricated or precast transition section (usually consisting of a porous ceramic or plastic transition layer), between the underdrain system and the filter media bed itself.

Filters both of the downflow and upflow type have for many years been cleaned by backwashing. During this process, water or a combination of water and air (either sequentially or simultaneous) is passed through the filter bed in an upward direction, which in the case of a downflow filter is opposite to the direction of fluid flow during filtration.

During the filtering process, the underdrain system controls the flow of the liquid that is being filtered so that it is distributed as uniformly as possible over the entire horizontal cross-sectional area of the filter media bed. In a downflow filter, the underdrain system also provides uniform collection of the water after it has passed through the filter bed.

From time to time, cleaning of the filter media becomes necessary because of the increasing resistance to flow caused by the accumulation of suspended solids that have been captured by the filter media, and are attached to filter media particles or are lying in the interstices formed by adjoining filter media particles. During the cleaning of a downflow filter, the underdrain system controls the flow of water (and air as well, when it is used) in the reverse direction from the direction of flow that occurs during the filtering process.

The maximum rate of liquid flow through the filter media bed is as a rule greater during the relatively short periods of time that the filter media bed undergoes backwashing than the rate of flow is during the normal filtration mode. For this reason, the description in this specification of the operation of the present invention is confined to its operation during backwashing and scouring of the filter bed.

When air is used in the scouring of a filter bed, the air bubbles up through the filter and provides a very thorough agitation of the particles in the filter media. The agitation dislodges accumulated dirt and/or gelatinous floc, which can then be removed easily by the liquid backwashing, whether carried out at separate times from, or simultaneously with, the air scouring. This thorough agitation of the filter media is particularly useful for cleaning those filters in which heavy, sticky deposits are formed in the media during the filtering process.

In many of the known underdrain systems for filter beds, gases and liquids flow through common passages to common points of discharge. The fact that in these systems physically very disparate fluids—a liquid and a gas—are simultaneously conveyed, and discharged, through the same channel and opening has in practice often led to very serious problems. Two of these are that (1) because of the conflict between the flow rates of the two fluids, strict upper limits are imposed on the liquid and gas flow rates, and (2) the intermixing of liquid and gas caused by the common passages and discharge openings results in coalescence of the air bubbles into larger bubbles, and in unwanted turbulence.

If such coalescence occurs inside a conduit used for both water and air, the larger bubbles thus formed can act like valves and impede the flow of water through a number of discharge openings, which may produce damage to the system as the water backs up. In some prior art underdrain systems, the intermixing of water and air and the resulting coalescence into larger air bubbles take place outside the conduits for the liquid and gas, in the gravel support bed above the underdrain, before the two fluids enter the filter bed itself. The resulting turbulence can produce an undesirable movement and expansion of the gravel support bed.

The goal of backwashing and scouring is to loosen and agitate the filter media itself as much as feasible. In fact, in the case of a filter bed that has more than one filter media layer, the materials comprising the bed are preferably selected so that their size and specific gravity will mean that the entire bed will fluidize at the same backwash flow rate. In contrast to this, any loosening and expansion of the support bed directly under the filter media bed is not desired, because it may disrupt the physical integrity of the filter bed lying above it. Thus it is important that intermixing of the streams of water and air and the resulting turbulence be avoided, to the extent possible, at all times prior to the introduction of the two fluids into the filter media bed itself.

Still another reason for avoiding intermixing of the washing liquid and scouring air as long as possible, preferably until the two fluids are actually introduced into the filter media bed, is that the likelihood of maintaining a high degree of uniformity in the distribution of the water and air within the filter media bed is greater if the intermixing first occurs in the media bed itself. Lack of uniformity of distribution of backwash water and scouring air within the filter bed can seriously impair the filtering action of the filter because various portions of the filter bed may remain contaminated even after backwash. In addition, non-uniform distribution can disrupt the bed. Furthermore, non-uniform distribution of wash water within the filter bed tends to result in the formation of "mud balls," which are balls of contaminant that form in small portions of the bed through which minimum backwash water flows. Non-uniform distribution may also cause "sand boils," and even shifting of the media and/or piling up of the media particles in some portions of the bed. It is then often necessary to remove the filter media and place a completely fresh filter media bed.

Backwashing a filter bed with water and scouring with air, carried out either sequentially or simultaneously, have been known for a very long time. The use of water and air in this way is referred to, for example, in U.S. Pat. No. 801,810 issued to Parmelee on Oct. 10, 1905, as being already well known at that time. Over the intervening decades, a very large number of underdrain systems for cleaning beds of filter media in this way have been devised. However, there has been no recognition in these systems of the desirability of avoiding intermixing of the washing water and scouring air at all times prior to introduction into the filter media bed itself. In fact, most of these systems have permitted, or even deliberately brought about, mixing of the water stream and air bubbles at some point before they are introduced into the filter media.

The advantages of an integrally constructed, completely self-contained module that can be assembled side-by-side with other modules to form an underdrain system for a filter bed have also been long recognized. (Typical of such prior devices is the device disclosed in U.S. Pat. No. 2,378,239 issued to Myron on Jun. 12, 1945.) However, the only other underdrain system known to the applicant that entirely precludes the intermixing of water and air within an integrally constructed underdrain module (U.S. Pat. No. 4,995,990 issued to Weston on Feb. 26, 1991) does not suggest any of the following definite advantages that are provided by applicant's invention (1) An underdrain system the top surface of which is substantially flat, covering substantially the entire surface area of the underdrain system, thereby providing virtually unlimited flexibility for the spacing of water and air discharge openings.

(2) Horizontal separation of air and water openings.

(3) The avoidance, or even the minimizing, of intermixing of water and air within the support bed of gravel or other material before the rising streams of water and air bubbles reach the filter media bed itself.

SUMMARY OF THE INVENTION

The underdrain module of this invention, which in use is positioned below a filter bed that removes particulate matter and other contaminants from a liquid that passes through the filter bed, is an elongated, integrally constructed, self-contained unit having an enclosed interior and a substantially flat, substantially rectangular, exterior top wall. It is preferred that it have a substantially rectangular exterior cross section.

The module has separate discharge openings in the top exterior wall, through which washing water and scouring air, respectively, can pass separately from said interior during the cleaning of the filter which is carried out from time to time. The module contains two enclosed conduits, one for water and one for air, for separately conveying water and air (which are introduced into the interior of the module under pressure for use in cleaning the filter bed), to the respective discharge openings for the two fluids. The water and air are introduced under pressure into the interior of the module through separate inlet openings for introducing water at a first rate of flow and air at a second rate of flow. The conduits are located within, and are integrally constructed with, the module. The conduits are operatively connected from the inlet openings for water and for air directly to the respective sets of discharge openings for water and air in the top wall of the module.

The discharge openings for a given fluid are preferably all substantially the same shape and size, and preferably substantially uniformly spaced along the length of the underdrain module. They are in addition preferably located so that when a plurality of these modules are assembled side-by-side in a filter underdrain system with each module separated form the adjacent module on either side by substantially the same predetermined distance, the discharge openings for a given fluid are substantially uniformly spaced laterally across the assembled elongated modules. The discharge openings for the two fluids are all located in the same exterior wall, i.e., the top wall of the module, between the exterior side walls of the modules and spaced from the side walls. No other discharge openings for water or air are present in the walls of the module.

One or both of the conduits for water and air within the underdrain module may be provided with at least one internal partition to form a plurality of ducts for each fluid. Any such internal partition contains at least one opening through which the fluid in question can pass from one of these ducts for a given fluid to the other duct for the same fluid. As used in this specification and the accompanying claims, the term "conduit" is used for the total passageway for a particular fluid (such as water or air), and the term "duct" is used for a portion of a given conduit.

Satisfactory and preferred values are disclosed for the ratio of the cross-sectional area of the interior of the conduit in the underdrain module and the cross-sectional area of the interior of the conduit in the module for conveying scouring air. Similar figures are disclosed for the ratio of the total cross-sectional area of all the discharge openings for washing water and the total cross-sectional area of all the discharge openings for scouring air.

The filter underdrain system of this invention is comprised of at least one row of a plurality of the underdrain modules of the invention. The modules in each of the rows are operatively connected in series, with the downstream end of the last module in the row being closed, and are operatively connected to sources that supply water and air, respectively, both under pressures appropriate to the fluid in question. The rows in a system having a plurality of rows are arranged side-by-side.

Among other things, satisfactory, improved and further improved spacing of the underdrain modules from each other in the assembled underdrain system are disclosed. The assembled, side-by-side modules are preferably in substantial contact with each other, either directly (with a layer of glue of negligible thickness between them) or separated by a layer of grout as a bonding agent.

ADVANTAGES OF THE INVENTION

Two of the advantages of using the filter underdrain module and underdrain system of this invention are:

(1) The ease of installing a filter underdrain system using such modules.

(2) The low cost of such a system.

The most important advantages stemming from use of the module and system of this invention, however, are the facts that:

(3) Although the flow channels for both the liquid and gas used in cleaning a granular media filter are combined in a single, integrally constructed, self-contained module, the channels are arranged so that the liquid and gas are separately conveyed to entirely separate discharge openings in the same module wall for each of the two fluids. These separate conduits and discharge openings avoid altogether intermixing of the two fluids within the interior of the module, and thus avoid the serious problems resulting from such intermixing that are discussed above. The two main problems avoided by the present invention are (a) unwanted coalescence of the air bubbles and the resulting unwanted turbulence, and (b) undesirable restrictions on the respective flow rates for the liquid and gas. To avoid the second problem, with the present invention the respective discharge openings for air and water can be specifically sized to provide the highest degree of uniformity of distribution at the lowest headloss over the anticipated range of flows. This has never before been thought to be possible with an integral, self-contained underdrain module, but only with an entirely separate set of water underdrains retrofitted with various types of air headers, grids or manifolds.

(4) The discharge openings for water are preferably uniformly spaced longitudinally of the elongated underdrain module and, when the module is incorporated in an underdrain system with other modules of the same kind, are preferably uniformly spaced laterally as well. The same is true of the discharge openings for air. This uniform distribution of the water and air discharge openings optimizes the uniformity of the distribution of washing water and scouring air throughout the filter media bed.

(5) The substantially flat, substantially rectangular exterior cross-section of the underdrain module, with all the modules in a given underdrain system being of the same height, produces a flat upper surface when the modules are assembled in the system. This provides substantially complete flexibility in the selection of the locations of the discharge openings for the washing water and scouring air, thus making possible a greater degree of uniformity in the distribution of those openings.

(6) The preferred rectangular exterior cross-section of the modules makes it possible for the upper surface of the underdrain system to extend substantially uninterrupted from one side wall to the other side wall throughout the entire filter tank. This also provides greater flexibility in the placement of the discharge openings for the two fluids.

(7) The resulting increased degree of uniformity in the distribution of discharge openings helps to avoid, insofar as possible, any intermixing of the liquid and gas in any support bed of gravel or other material beneath the filter media, before the rising stream of water and the rising air bubbles reach the actual filter media bed itself. This minimizes, if it does not avoid altogether, undesirable coalescence of the air bubbles, and increased turbulence, that such premature intermixing would otherwise cause.

(8) The rectangular shape of the conduits within the filter modules provides the greatest efficiency, for a filter tank of a given width, in the flow of water and air at given flow rates through the underdrain system.

(9) The underdrain system of this invention presents a flat surface to the overlying filter support bed or media bed. This fact allows very great flexibility in locating and spacing completely separate sets of discharge openings for air and water, respectively, in such a way as to produce the highest degree of uniformity possible in the distribution of washing water and scouring air.

BRIEF DESCRIPTION OF THE DRAWINGS

The invention will now be described by reference to the accompanying drawings, in which:

FIGS. 2, 3 and 4 are partial cross-sectional views taken along the lines 2—2, 3—3, and 4—4, respectively, in FIG. 1, showing alternative constructions for introduction of water and air under pressure into the underdrain system during cleaning of the filter bed;

FIG. 5 is an enlarged, fragmentary plan view of one of the modules of the underdrain system of FIG. 1;

FIG. 5A is a similar view of another embodiment of the underdrain module of this invention that illustrates an alternative, but still substantially uniform, spacing of the water and air;

FIG. 10 is a fragmentary plan view of three of the modules of an underdrain system according to this invention, showing a preferred pattern of distribution of water and air discharge openings in the top walls of adjacent modules;

FIG. 11 is a fragmentary isometric view of an underdrain system according to this invention that utilizes underdrain modules having the same pattern of distribution of water discharge openings and air discharge openings as shown in FIG. 10;

FIG. 12 is a cross-sectional view of the system of FIG. 11, taken along line 12—12 in the latter Figure.

FIG. 13 is a fragmentary plan view of another embodiment of the underdrain module of this invention;

FIG. 14 is a fragmentary plan view of a preferred embodiment of two side-by-side modules of this invention;

FIG. 15 represents a portion of FIG. 12; and

FIG. 16 is a fragmentary plan view of another preferred embodiment of two side-by-side modules of this invention.

DETAILED DESCRIPTION OF PREFERRED EMBODIMENTS

Various preferred embodiments of the underdrain module and underdrain system of this invention will now be described.

General Construction

Figure 1:
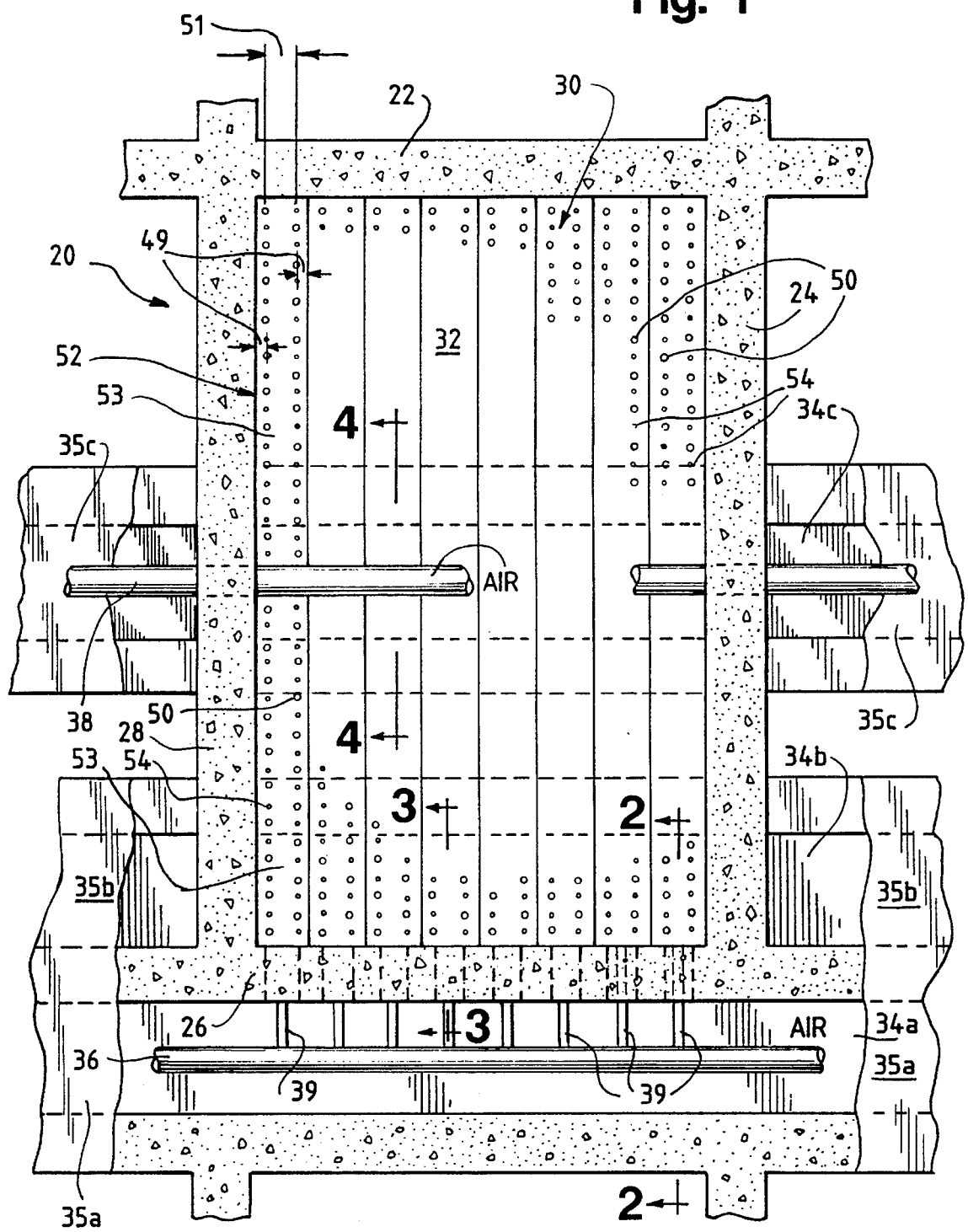
FIG. 1 is a plan view of one embodiment of the underdrain system of this invention, partly broken away including a plurality of the underdrain modules of this invention.

FIG. 1 provides a plan view of one embodiment of the filter bed underdrain system of this invention. Filter tank 20 encloses within its walls 22, 24, 26 and 28 a filter bed comprised of granular filter media of various sizes (not shown). If conditions require it, a support bed of gravel or other suitable material (not shown in this Figure) may be provided between the filter media bed and the underdrain system.

Underdrain system 30 includes a plurality of underdrain modules 32, which in an actual installation are preferably all identical in configuration and size. In this embodiment, each underdrain module extends from end wall 22 to end wall 26 of the filter tank. If desired, each underdrain module can be shorter. In any such case the modules in a row that contains more than one module are operatively connected in series. Underdrain system 30 shown in FIG. 1 includes eight rows of underdrain modules 32 assembled side-by-side. These modules substantially cover the entire floor of filter bed 20.

As will be described below, each underdrain module 32 contains at least two enclosed conduits for separately conveying water and air under pressure that are introduced into the interior of the module for cleaning of the media filter bed. Each of said conduits is operatively connected to sources (not shown) of water and air, respectively.

In the embodiment of FIG. 1, wash water for cleaning the filter bed is supplied under pressure through enclosed flumes 34, which for illustrative purposes, is also shown in this Figure as being supplied under pressure to conduit 40 in each of the underdrain modules in three different ways, two of them through air duct 36 and one of them through air duct 38.

FIG. 2, a cross section taken along the line 2—2 in the lower right hand corner of FIG. 1, illustrates the first of these. As seen in FIGS. 1 and 2, scouring air is supplied by main duct 36 under pressure to branch ducts 39, and from there to separate conduits 40 in each module 32. These separate ducts are formed by horizontal partition 42. On the other side of partition 42, water flows under pressure from enclosed flume 34a through opening 43 into separate conduits 44. (As will be seen, the discharge openings for air and water in conduits 40 and 44 respectively, are omitted from this Figure, and from FIGS. 3 and 4 as well.)

FIG. 3, which is a sectional view taken along line 3—3 in the lower, central portion of FIG. 1, shows a second construction for introducing water under pressure into conduit 44 of underdrain module 32. In this construction, water is supplied to conduit 44 from enclosed flume 34b through opening 46. Water flume 34b underlies the confines of the filter cell, and water is allowed to enter each row of underdrain modules through the opening at the bottom of each water duct.

FIG. 4 is a cross-sectional view taken along line 4—4 in FIG. 1. In this construction, air is introduced under pressure into conduit 40 of underdrain module 32 from main duct 38. Water is supplied under pressure to duct 44 from enclosed flume 34c through opening 48 at the bottom of the duct. This method of air and water introduction is useful with longer underdrain modules, in order to enhance the degree of uniformity of fluid distribution, as well as to permit the use of underdrain modules of smaller cross-sectional area.

In FIG. 1, top walls 35a, 35b and 35c of enclosed flumes 34a, 34b, and 34c, respectively, are broken away to expose the other elements of the underdrain system illustrated in the Figure. For clarity, in FIGS. 2 through 4, top walls 35a, 35b and 35c are omitted altogether.

Pressure Within Single Row of Conduits, and Between Rows of Conduits, for Given Fluid As will be recognized, the pressure differential along the entire length of a single row of similar water conduits 44 (or a single conduit, as the case may be) is in most cases virtually insignificant compared to the pressure differential, or headloss, generated across the discharge openings for that row of conduits (or single conduit), since the ratio of the total cross-sectional area of all the water conduits 44 to the total cross-sectional area of all the water discharge openings 50 is relatively high. Combining this with the fact that water under pressure is typically introduced into conduits 44 from a common source (through enclosed flumes 34a, 34b, or 34c) means that the water pressure in each row of conduits 44 will tend to be substantially equalized with the pressure in the other conduits 44 in the underdrain system. This is important, of course, in order to achieve the highest possible degree of uniformity in the distribution of the washing water in the filter media.

Similarly, in the case of air introduced from a common source (main air duct 36), with a high ratio of total air conduit cross-sectional area to total air discharge opening cross-sectional area, the air pressure in each conduit 40 will tend to be substantially equalized with the pressure in the other conduits 40 throughout the system. This is, again, important in order to achieve the highest possible degree of uniformity in the distribution of the scouring air in the filter media.

The higher the ratio between the total cross-sectional area of the conduits for a given fluid—water or air—to the total cross-sectional area of the discharge openings for that fluid, the better the degree of uniformity of fluid distribution will be. Naturally there is a practical upper limit for this ratio, usually dictated by energy management requirements or other limitations.

It will be understood that, if desired, additional means may be included in the underdrain modules that will provide—especially in any case in which the various water conduits do not have a common source—increased fluid communication between the washing water conduits in adjacent modules. Such increased fluid communication may further help to equalize the water pressure throughout all the assembled modules of the underdrain system.

Separate Discharge Openings And Conduits

FIG. 5 is an enlarged, fragmentary plan view of the initial portion a particular underdrain module 52 that can seen on the lower left-hand side of FIG. 1. It illustrates the same distribution of water through discharge openings 50 as has been described above in the Summary of the Invention. As pointed out just above in the discussion of FIGS. 2–4, conduits 44 and 40 of underdrain module 32 (and thus of particular module 52 as well) provide two entirely separate passageways for water and air, respectively.

Openings 50 in top wall 53 of module 52 are provided for discharge of streams of water from the module into the filter media bed or the support bed, as the case may be. These discharge openings are preferably all substantially the same shape and size and preferably substantially uniformly spaced along the length of the module.

Openings 54, usually smaller than water discharge openings 50, are provided for discharge of steams of scouring air in the same way. (If for some reason a fewer than usual number of air discharge openings is used, it may be that they will not be smaller than the water discharge openings.) These openings for air are also preferably all substantially the same shape and size, and preferably substantially uniformly spaced along the length of underdrain module 52.

In the embodiment of FIG. 1, discharge openings 50 for water are located in top wall 53 of module 52 in positions such that in a plurality of elongated modules of this type assembled side-by-side in a filter underdrain system, the discharge openings for water are substantially uniformly spaced laterally across the top walls of the assembled modules. In this embodiment, there are two parallel rows of water discharge openings 50 in the top wall of each module 52, and each module is in full contact with adjacent modules of the same kind on both sides (except for the modules on the far left- and right-hand sides of FIG. 1, which have such contact on only one side).

Water discharge openings 50 on the righthand side of the leftmost module 52 in FIG. 1 are located at distance 49 from the right-hand edge of the module, and water discharge openings 50 on the left-hand side of the module are spaced a substantially equal distance 49 from the left-hand edge of the module. In addition, the two rows are spaced from each other a distance 51 which is substantially twice distance 49.

As will be seen from this example, with the module of this invention the lateral spacing and location of the rows of water discharge openings 50 in top wall 53 of a given underdrain module 52 can readily be selected so that substantially equal lateral spacing with all the rows of discharge openings 50 on other modules 52 of the total underdrain system can be achieved. The selection will be affected, of course, by the number of longitudinal rows of water discharge openings that are present in the top wall of each module.

In the embodiment of FIGS. 1 and 5, there are two rows of water discharge openings 50 in top wall 53 of module 52. There are also two rows of air discharge openings 54 in wall 53. This is advantageous because underdrain modules are ordinarily fairly wide, and if there were only one row of either water or air discharge openings in each module of conventional width, there would be an undesirable separation of each such row from the similar row in the adjacent module when the two modules are installed in an underdrain system. Too large a separation between adjacent rows of discharge openings of the same type (especially the air discharge openings) will result in undesirably wide areas in which there is little or no distribution of the fluid in question. One row of discharge openings for water and one row for air are, however, satisfactory if the individual modules are significantly narrower in width than is conventional.

FIG. 5A shows a portion of another embodiment of an underdrain module 52' according to the present invention. In this embodiment, longitudinal rows of discharge openings 50' alternate with longitudinal rows of air discharge openings 54'. As will be seen, when one underdrain module 52' is placed in side-by-side relationship with other similar modules on each side, the rows of water discharge openings 50' in the top walls 53' of the modules will be substantially equally spaced laterally. In the same way, the rows of air discharge openings 54' will be substantially equally spaced laterally across top walls 53' of the adjacent modules on either side. The air discharge openings are substantially equally spaced longitudinally along the top wall of the module, as are the water discharge openings.

As will be noted, in the embodiments of FIGS. 5 and 5A there are two rows of air discharge openings 54 and 54', respectively, in the top wall of each underdrain module. As with the water discharge openings, it is important to have at least two such rows in each module of conventional width. For if there is only one row of air discharge openings in each underdrain module, there will again be such a wide area without air discharge openings in the top wall of the module on both sides of that single row of openings that when two or more modules are placed side-by-side in an assembly of modules in an underdrain system, there will be much too large an area between the rows of openings in adjacent modules, which will adversely affect the degree of uniformity of distribution of the streams of scouring air across the filter bed as a whole.

The same considerations hold true for rows of water discharge openings 50 and 50' in FIGS. 5 and 5A, respectively, although not quite to the same extent because the water discharge openings are larger than the air discharge openings are.

Figure 7:
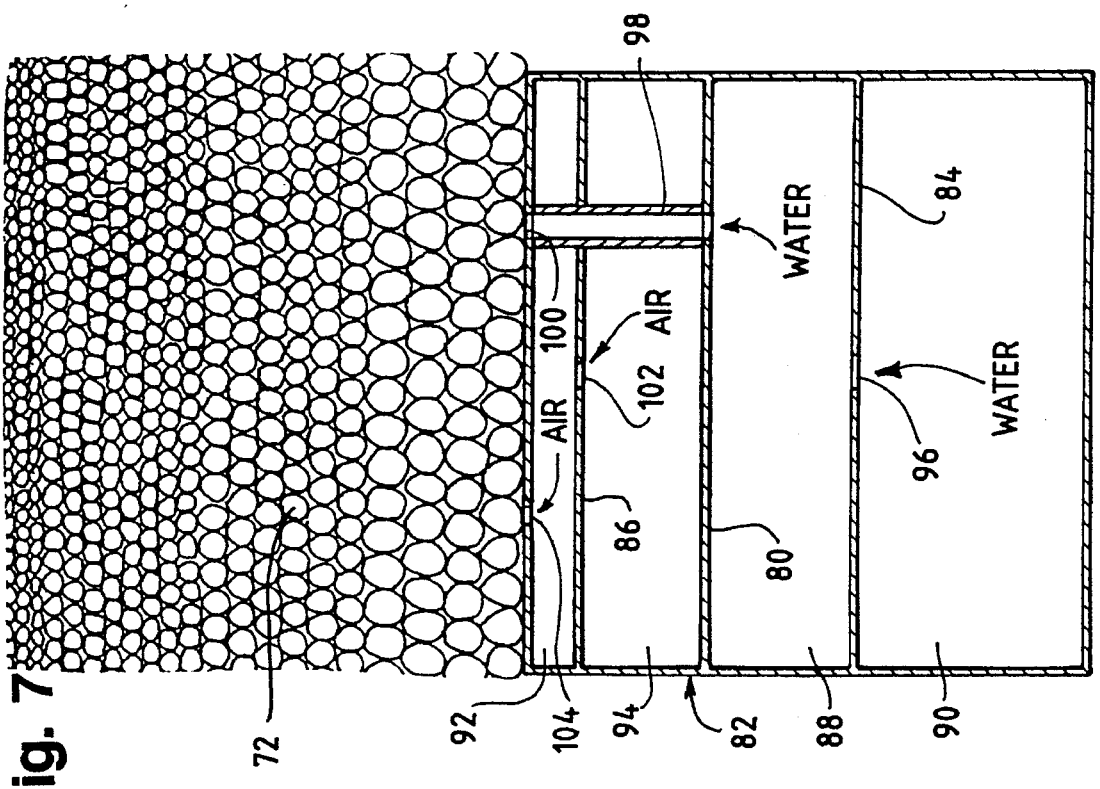
FIG. 7 is a cross-sectional view taken along the line 7—7 in FIG. 5, again showing for purposes of illustration another internal conduit structure.
Figure 6:
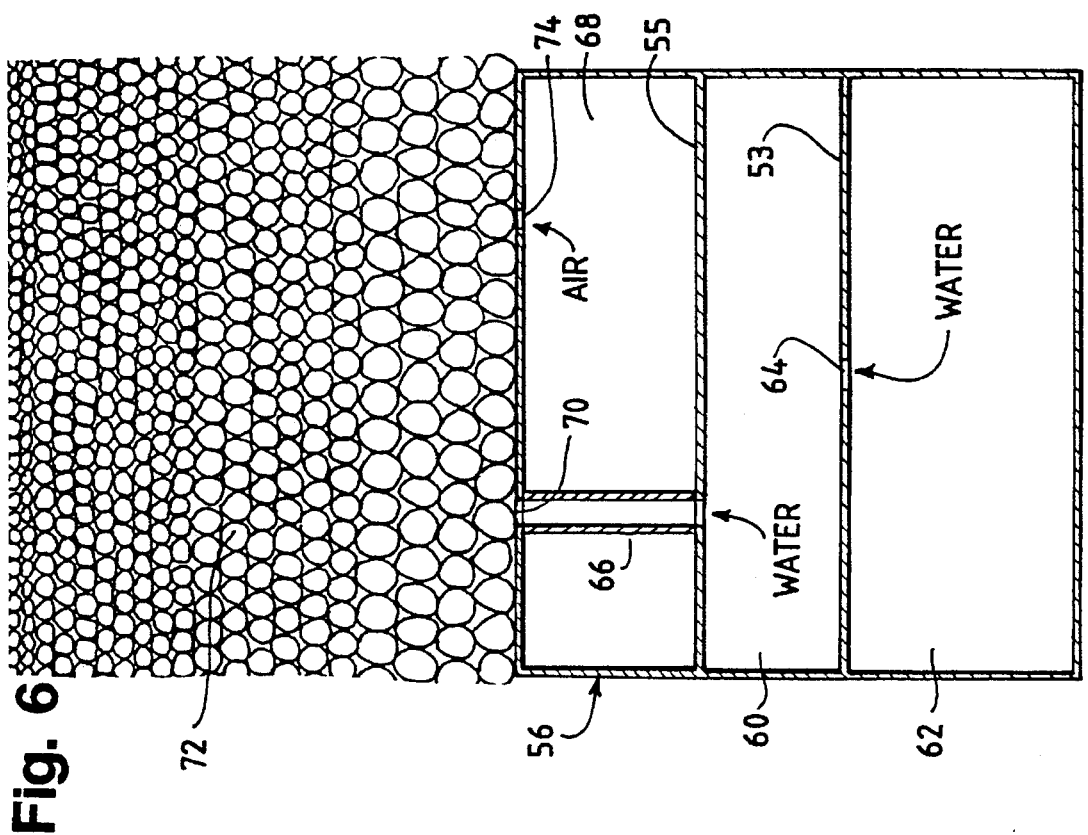
FIG. 6 is a cross-sectional view taken along the line 6—6 in FIG. 5 but, for purposes of illustration, showing another internal conduit structure, with a gravel support bed above the module.

FIGS. 6 and 7 are cross-sectional views that are taken at the locations indicated by lines 6—6 and 7—7 in FIG. 5 but, for purposes of illustration, they show two other internal conduit arrangements from what is shown in FIGS. 2–4.

In FIG. 6, horizontal partition 55 divides underdrain module 56 into separate passageways for water and for air. The separate passageway for water is further divided by horizontal internal partition 58. This latter partition divides the conduit for the passage of water into two separate ducts 60 and 62. (As used in this specification and the accompanying claims, the term "conduit" is used for the total passageway for a particular fluid (such as water or air), and the term "duct" is used for a portion of a given conduit.)

These separate ducts are in this embodiment connected by aperture 64, through which water can pass from one of the ducts to the other. Duct 62 may be considered to be a feeder duct, and duct 60 may be considered to be a distributor duct. In the operation of this underdrain module during the cleaning process, water under pressure passes through pipe 66 (which extends through air duct 68) and out through discharge opening 70, to flow upward through graded gravel support bed 72.

The separate, interconnected plurality of ducts 60 and 62 just described provide greater flexibility in the sizing and spacing of the discharge openings for the washing water. Without this flexibility, substantially greater limitations are imposed on the flow rate ranges of the two fluids.

In this embodiment, conduit 68 for the passage of air is a single passageway. The scouring air that flows under pressure through separate conduit 68 of underdrain module 56 flows from discharge openings 74 in the form of air bubbles through gravel support bed 72, and from there into the filter media bed.

In the embodiment of FIG. 7, horizontal partition 80 divides underdrain module 82 into separate passageways for water and for air. The separate passageway for water is further divided by horizontal internal partition 84, and the separate passageway for air is divided by horizontal internal partition 86. Partition 84 divides the conduit for the passage of water into two separate ducts 88 and 90. These separate ducts are in this embodiment connected by aperture 96, through which water can pass from one of the ducts to the other.

Ducts 88 and 90 may be considered to be a distributor duct and a feeder duct, respectively. In the operation of this underdrain module, washing water under pressure passes through pipe 98 (which extends through air ducts 92 and 94) and out through discharge opening 100, to flow upward through graded gravel support bed 72.

Separate air ducts 92 and 94 are connected by aperture 102, through which air can pass from one of the ducts to the other. Ducts 92 and 94 may be considered to be a distributor duct and a feeder duct, respectively. The separate, interconnected plurality of ducts 92 and 94 (formed by horizontal partition 86) provide greater flexibility in the sizing and spacing of the discharge openings for the scouring air. During the cleaning process, air flows under pressure out of discharge opening 104 in the form of air bubbles through a gravel support bed 72, and from there into the filter media bed. Partition 86 divides the conduit for the passage for air into two separate ducts 92 and 94.

Additional Embodiments

Figure 8:
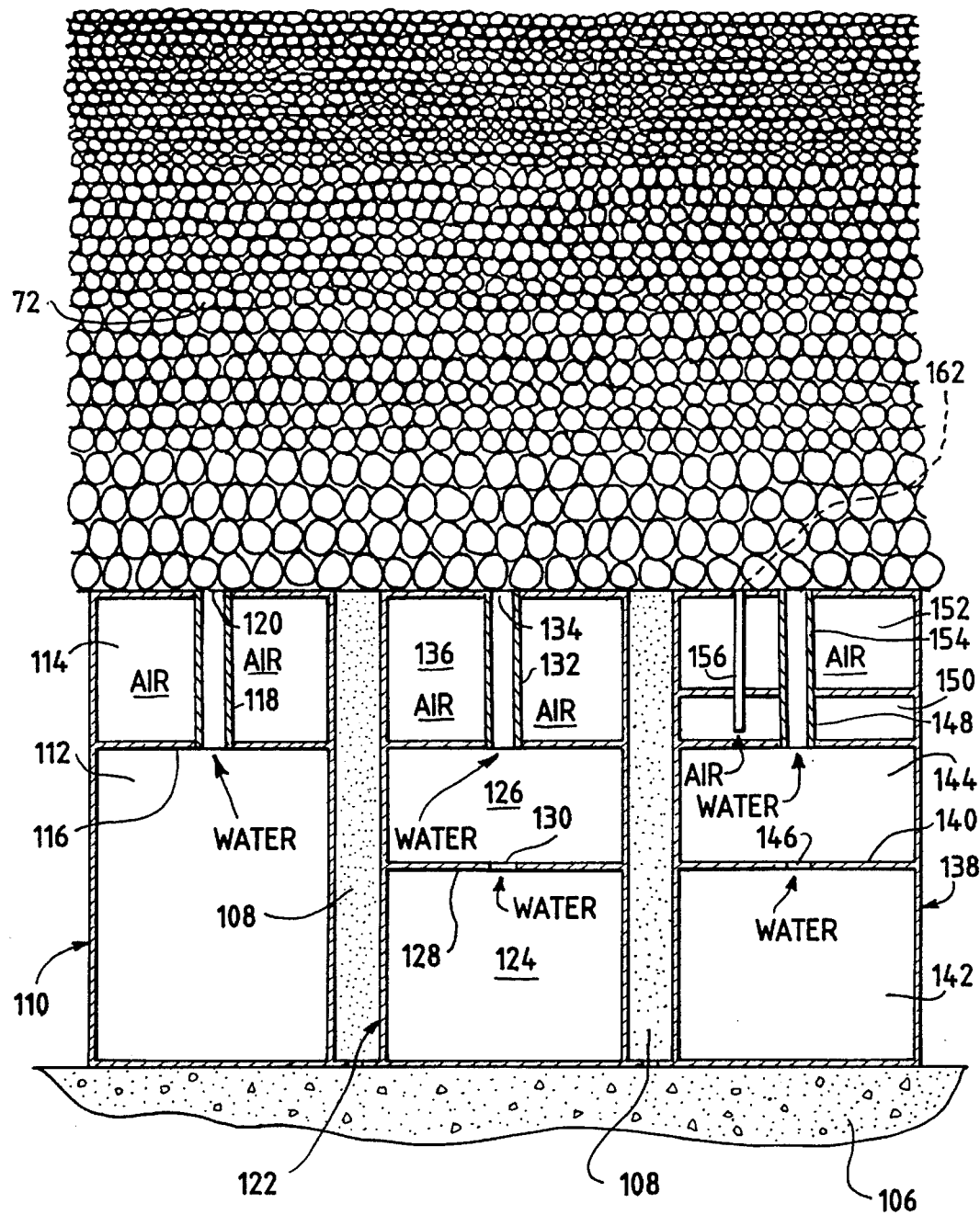
FIG. 8 is a cross-sectional view of an underdrain system for this invention in which each of the three underdrain modules shown has a different combination of ducts for the water and air, with a gravel support bed above all the modules.

FIG. 8 shows cross-sectional views of three underdrain modules according to this invention, which are divided in various ways by horizontal partitions. The three modules rest on concrete floor 106 at the bottom of the filter cell. They are separated from each other by a relatively short distance, with the spaces 108 between them filled with a suitable grout.

Underdrain module 110 on the left-hand side of FIG. 8 contains single separate ducts 112 and 114, formed by horizontal partition 116, for water and air, respectively. In the operation of this embodiment during the cleaning process, water under pressure passes through pipe 118 (which extends through air duct 114) and out through discharge opening 120, to flow upward through graded gravel support bed 72. In this embodiment, the water and air discharge openings are longitudinally spaced from each other along the underdrain module, so the discharge openings for air are not seen in the cross-sectional view of FIG. 8.

In the embodiment illustrated in the central portion of FIG. 8, underdrain module 122 has dual ducts 124 and 126, formed by horizontal partition 128, for water. Passage of water from one of these ducts to the other is provided through aperture 130 in the partition. Water under pressure exits from duct 126 through pipe 132 and out discharge opening 134. Pipe 132 extends through single air duct 136.

In the embodiment shown on the right-hand portion of FIG. 8, underdrain module 138 has dual ducts for both water and air. Horizontal partition 140 forms ducts 142 and 144 for water, with intercommunication between these two ducts provided by aperture 146 in partition 140. During the cleaning operation, water under pressure exits from distributor duct 144 through pipe 148 (extending through air ducts 150 and 152), and then out through discharge opening 154.

In this embodiment, downwardly extending stem 156 is indicated as being longitudinally spaced from the plane of the cross section shown in FIG. 8. Scouring air entering underdrain module 138 flows first into feeder duct 152, and from there through an aperture (not shown) into distributor duct 150. It then flows out through stem 156 and into gravel support bed 72 through air discharge opening 162. Because the bottom end of stem 156 is positioned near the bottom of distributor duct 150, if any water has entered either air duct 150 or 152, it will be expelled by the pressure of the air, first from the feeder duct and then the distributor duct, so that air can pass upward through stem 156 and opening 162, as described.

Figure 9:
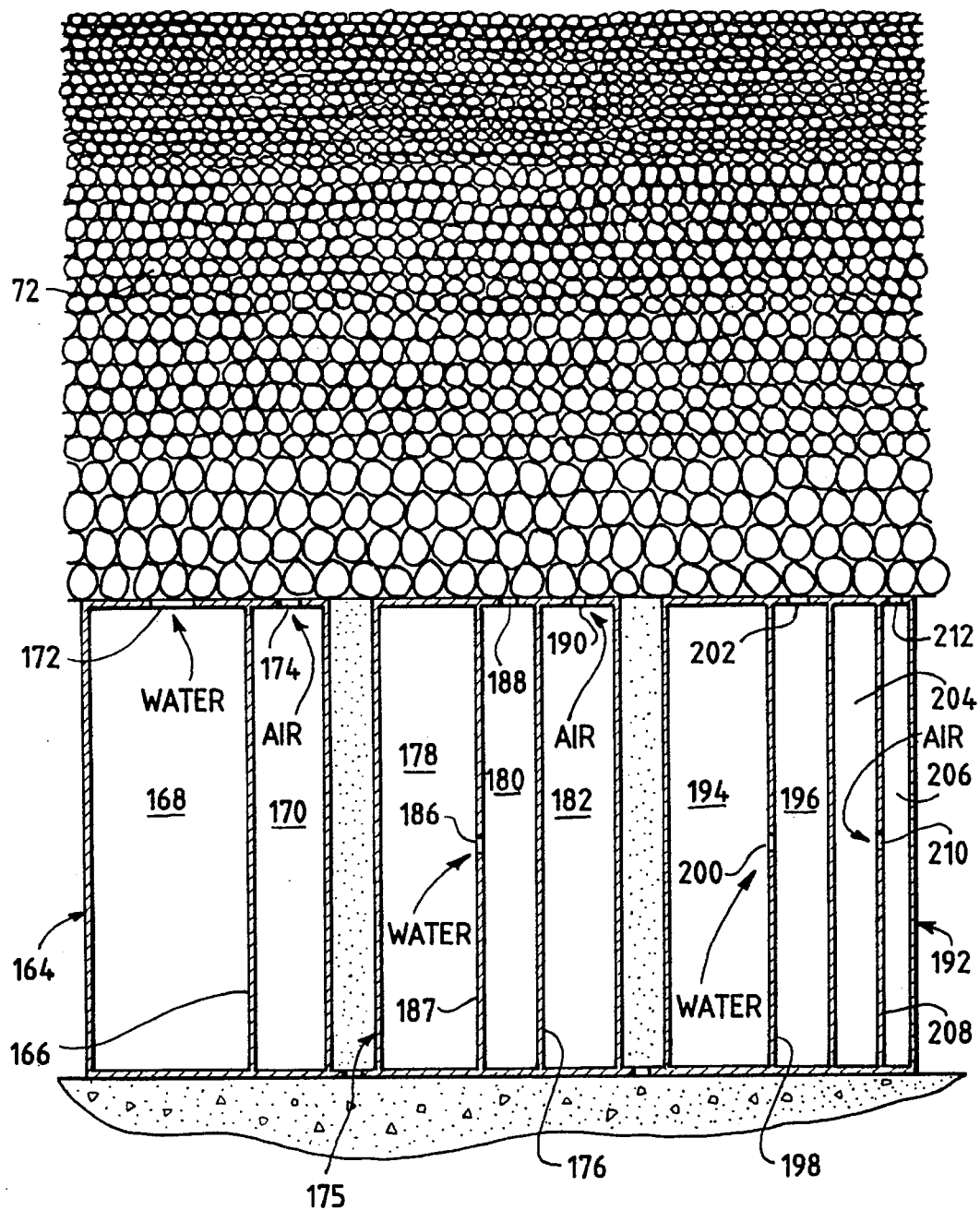
FIG. 9 is a similar view illustrating three other embodiments of underdrain modules according to this invention.

FIG. 9 shows cross sections of three underdrain modules according to this invention that have vertically disposed internal partitions separating the water and air conduits in each case. In two of the embodiments, other vertical partitions form dual ducts in one or both of the fluid conduits. These configurations tend to enhance the structural integrity of the module, especially in deeper ones, by the additional support provided by the vertical partitions. Nevertheless, in most applications the underdrain module with horizontally disposed internal partitions is preferred, because of the virtually unlimited flexibility it provides in locating the discharge openings for the cleaning water and scouring air.

In underdrain module 164 (on the left-hand side of FIG. 9), vertical partition 166 divides the module into separate ducts 168 and 170 for water and air, respectively. During the cleaning process, water exits through discharge opening 172 in the top wall of the module, and air exits through discharge opening 174.

In the embodiment shown in the central portion of FIG. 9, partition 176 separates dual ducts 178 and 180 for water from single duct 182 for air. The dual ducts for water are formed by vertical partition 184, which contains aperture 186 for communication between the dual ducts. Water exits from this module 175 through discharge opening 188 at the top of the module. In this embodiment, air exits from the module through discharge opening 190.

In underdrain module 192 shown on the right-hand side of FIG. 9, dual water ducts 194 and 196 are formed by vertical partition 198. Communication between these two ducts is provided by aperture 200 in partition 198. During cleaning of the filter bed, water under pressure exits through discharge opening 202 at the top of the module. Dual air ducts 204 and 206 are formed by vertical partition 208. Communication between these two ducts is provided by aperture 210 located in vertical partition 208. Air exits from the module through discharge opening 212 at the top of the module.

FIG. 10 is a fragmentary plan view of top walls 240 of underdrain modules 242 arranged side-by-side in the best mode for an underdrain system according to this invention that is contemplated by applicant at this time. Each module is separated from its adjacent modules by a distance about equal to 1/20 of the width 244 of the module. Spaces 246 between adjacent modules are filled with grout or other material suitable for bonding and spacing adjacent rows of modules.

With modules 242 in the assembled condition shown, each air discharge opening 248 is separated from the longitudinally spaced air discharge opening in either direction by distance 250. In the same way, the air discharge opening 248 is separated from the laterally spaced air discharge opening on either side of it by substantially the same distance 250. Each water discharge opening 252 is similarly separated from the adjacent longitudinally and laterally spaced water discharge openings by a substantially equal distance 254.

As will be seen, this pattern of discharge openings is substantially uniform throughout as to air discharge openings 248, and also as to water discharge openings 252. In addition, each of the individual discharge openings in each set of such openings for a given fluid is spaced substantially uniformly from the surrounding discharge openings for the other fluid. Thus, in FIG. 10, each air discharge opening 248' is spaced a distance 256 (somewhat smaller than distance 250) from each of the four water discharge openings surrounding it, which are located at 45°, 135°, 225° and 315° measured from the longitudinal axis of the module. Likewise, each water discharge opening 252' is separated by a distance 258 (somewhat smaller than distance 254) from each of the air discharge openings surrounding it.

In each case, the distances referred to are measured from the center of one discharge opening to the center of the other discharge opening. Distances 250 and 256 for the air discharge openings are substantially equal, respectively, to distances 254 and 258 for the water discharge openings.

FIG. 11 shows a fragmentary, isometric view of an underdrain system according to this invention in which air discharge openings 248 and water discharge openings 252 have the same distribution pattern in top walls 240 of underdrain modules 242 as in FIG. 10. Adjacent modules in this assembly of underdrain modules are separated by a thin layer of grout 246' that is about 1/12 as wide as the module. Underdrain modules 242 separated by grout layers 246' rest upon a layer of additional grout and upon concrete support bed 280.

In the underdrain module that is employed in the underdrain system of this Figure, the conduit for conveying water includes feeder duct 260 at the bottom of the module and two smaller distributor ducts 262 that are separated from the feeder duct by horizontal wall 264, and are further defined by three short vertical walls 266. Feeder duct 260 communicates with distributor ducts 262 through openings 270 (seen on the right-hand side of FIG. 11) in horizontal divider wall 264. Wash water conveyed through feeder duct 260 flows through openings 270 in bottom wall 264 of distributor ducts 262 and out through discharge openings 252.

Scouring air is conveyed through underdrain module 242 by two air ducts 272, and flows out of the module through air discharge openings 248. The duct on the left-hand side of center module 242 in FIG. 11 is defined by horizontal wall 264, module side wall 274, module top wall 240 and one of the short vertical walls 266. The other air duct 272 is defined in the same way except that one of the short vertical side walls 266 replaces module side wall 274. As will be seen, the two air ducts 272 alternate with two water feeder ducts 262 across the top portion of the underdrain module.

FIG. 12 is a cross-sectional view of the assembly of modules 242 shown in FIG. 11, taken along line 12—12 in the latter Figure.

The embodiment of FIGS. 10 through 12 is one of the most preferred embodiments of the underdrain system of this invention, because it combines the advantages of (1) very great flexibility in locating the water and air discharge openings and (2) increased structural strength provided by horizontal wall 264 and short vertical walls 266 with (3) greater ease of fabrication.

Important Ratios

As mentioned above, the water discharge openings of the underdrain module of this invention are usually larger than the air discharge openings (for example, openings 50 and 54 in FIGS. 1 and 5.) For best results when using a granular media filter bed in the filtration of water or in the filtration of waste water of industrial or municipal or domestic origin, the ratio of the total cross-sectional area of all the discharge openings for backwash water and the total cross-sectional area of all the discharge openings for scouring air should fall between certain limits. This ratio will produce satisfactory results if it falls in the range from about 10 to about 40. It is preferred that the ratio fall in the range from about 15 to about 30.

The particular ratio for a given installation will be determined by the respective flow rates of the water and air, and by the probable maximum variation in each of these flow rates and the degree of uniformity desired. In other filtration systems in which either the backwashing liquid or the scouring gas (or both), is other than water or air, the indicated satisfactory and preferred ratios are somewhat different from the figures just given.

In the embodiment shown in FIG. 6, the total cross-sectional area of water ducts 60 and 62 is a little more than twice the cross-sectional area of air duct 68. For best results when using a granular media filter bed in the filtration of water or in the filtration of waste water of industrial or municipal or domestic origin, the ratio of the cross-sectional area of the conduit for backwash water and the cross-sectional area of the conduit for scouring air should fall between certain limits. This ratio will produce satisfactory results if it falls in the range from about 1.5 to about 25. It is preferred that the ratio fall in the range from about 4 to about 15.

Again, as with the embodiment of FIGS. 1 and 5, in the embodiment of FIG. 6 the particular ratio for a given installation will be determined by the respective flow rates of the water and air, and by the probable maximum variation in each of these flow rates. In other filtration systems in which either the backwashing or the scouring gas (or both), is after than water or air, the indicated satisfactory and preferred ratios are somewhat different from the figures just given.

Another important ratio in the underdrain system of this invention involves the positioning of the underdrain modules on the bottom floor of the filter bed. The closer the underdrain modules forming the underdrain system of this invention are positioned to each other, the greater is the flexibility in positioning the water and gas discharge openings on the upper surface of the side-by-side modules. Some flexibility is provided when the distance between adjacent underdrain modules is no greater than a minor fraction of the width of one of the elongated modules. Greater flexibility is provided if that distance is no more than about 1/5 of the width of a module, and still more flexibility is provided when the distance in question is no greater than about 1/10 of the width of one of the elongated modules. For the greatest flexibility in the positioning of the water and gas discharge openings, it is preferred that the adjacent modules be in substantial contact with each other.

Positioning of Water and Air Discharge Openings

The positioning of the discharge openings in the top wall of the underdrain module of this invention is discussed above in connection with the three embodiments shown in FIGS. 1 and 5, FIG. 5A and FIGS. 10–12, respectively. A wide variety of other forms of positioning the discharge openings across the top wall of the module can be used with varying degrees of uniformity of distribution of the wash water and scouring air.

The most advantageous positioning of the two separate sets of discharge openings in the top wall of the underdrain module, one set for water and the other set for air, is obtained through use of a uniform geometric pattern of distribution of the openings. In particular, a rectangular grid pattern in which one plurality of parallel lines of discharge openings extends longitudinally along the top wall of the module, and a second plurality of parallel lines of openings is oriented perpendicular to the first plurality of parallel lines, is most suitable. The patterns shown in FIGS. 5, 5A and 11 discussed above are three examples. The embodiment of FIG. 5A, along with the embodiments of FIGS. 13, 14 (which is similar to FIG. 11) and 16, will now be discussed with reference to various rectangular grid patterns formed by the water and air discharge openings in the top wall of an underdrain module and underdrain's system according to this invention.

Of the various arrangements of discharge openings shown in the Figures mentioned, FIGS. 5, 5A and 13 show only a portion of a single module, but it should be understood that when the modules are in place in an actual underdrain system they will typically be arranged side-by-side with other modules of the same type. In all of the Figures referred to except FIG. 11, for simplicity it is assumed that the underdrain modules will be in direct contact (except for a very thin layer of glue) with the adjacent modules on both sides. However, they will often be separated by a layer of grout that acts as a bonding agent. (The effect of the layer of grout on the positioning of the discharge openings that are located adjacent one side or the other of the underdrain module is best seen in FIG. 15, which will be discussed below.)

In all the embodiments under discussion, all the discharge openings are arranged in a first plurality of straight lines extending parallel to the longitudinal axis of the modules. They are likewise all arranged in a second plurality of straight lines that are perpendicular to the longitudinal axis of the module. For example, in FIG. 5A lines 300 are seen to be parallel to the longitudinal axis of underdrain module 302, while lines 304 are perpendicular to the longitudinal axis of the module. In each case the arrangement described produces one form or another of a rectangular grid pattern of discharge openings.

(The terms "straight," "parallel" and "perpendicular" are used in this specification and in the accompanying claims to mean "substantially straight," "substantially parallel" and "substantially perpendicular," respectively.)

In the particular embodiment illustrated in FIG. 5A, all the discharge openings in any given longitudinal line of openings are for the same fluid, either water or air. For example, all the discharge openings 306 in longitudinal line 300 that is farthest to the left in FIG. 5A are for water, and all the discharge openings 308 in the next-to-last longitudinal line 300 on the left are for air. At the same time, all discharge openings—whether openings 306 for water or openings 308 for air—in any given perpendicular line 304 are alternately for one fluid and then the other.

Each longitudinal line 300 of discharge openings is laterally spaced from the immediately adjacent line of openings on either side of it by a distance 310 that is substantially equal to a first predetermined dimension $d_1$ selected by the designer of the module. The successive openings (whether water discharge openings 306 or air discharge openings 308) in a given line 300 are spaced from the immediately adjacent openings in either longitudinal direction along that line by a distance 312 that is substantially equal to a second predetermined dimension $d_2$ selected by the designer of the module.

Each perpendicular line 304 is spaced from the immediately adjacent perpendicular line 304 in either direction along the longitudinal axis of the module by a distance 314 that is substantially equal to a third predetermined dimension $d_3$. Successive openings in a given line 304 are spaced from the immediately adjacent openings in either lateral direction along the line by a distance 316 that is substantially equal to a fourth predetermined dimension $d_4$.

(In this specification and the accompanying claims, any reference to the distance between two discharge openings means the distance measured from the geometric center of the first discharge opening to the geometric center of the second discharge opening. The openings may be circular in cross-section, or oval, rectangular, square or any other suitable shape, as desired.)

In the underdrain module of FIG. 5A, first predetermined dimension $d_1$ is substantially one-half third predetermined dimension $d_3$, and second predetermined dimension $d_2$ is substantially twice fourth predetermined dimension $d_4$. As will be seen, these dimensions produce a square configuration for each group of four contiguous openings for a given type of fluid, either water or air. The resulting pattern of discharge openings gives a good degree of uniformity of distribution of washing water and scouring air across an underdrain system comprised of underdrain modules according to this invention.

(The first, second, third and fourth predetermined dimensions $d_1$, $d_2$, $d_3$ and $d_4$ each embodiment of the underdrain module of this invention will have their own specific values. Nevertheless, to aid in comparing the several rectangular grid patterns of discharge openings that are under discussion, the same designators $d_1$, $d_2$, $d_3$ and $d_4$ will be used in describing the embodiments of the various Figures of the drawings. The fact that each of these sets of predetermined dimensions is different is indicated by the different numerical designators that are assigned in the drawings to each set of dimensions.)

The last discharge openings 306' and 308' adjacent bottom end 320 of module 302 are longitudinally spaced from the bottom end by a distance 322 that is substantially equal to one-half of second predetermined dimension $d_2$. With this spacing of the discharge openings at the ends of each module in a longitudinally aligned row of underdrain modules, it will be seen that all the openings in the continuous line of discharge openings 300 that extends from module to module will be substantially equally spaced in both directions along that extended line.

Each discharge opening 306 or 308 that is adjacent the right- or left-hand side of module 302 is laterally spaced from the side of the module by a distance 324 that is substantially equal to one-half first predetermined dimension $d_1$. As a result of this positioning, when other underdrain modules of the same type are arranged side-by-side with, and in direct contact with, underdrain module 302 of FIG. 5A, the lateral spacing of the various longitudinal lines 300 of discharge openings across the surface of the entire underdrain system will be substantially uniform.

The embodiment of FIG. 13 utilizes another rectangular grid pattern of discharge openings. The discharge openings are all arranged in a first plurality of straight lines 330 extending parallel to the longitudinal axis of module 332, and they are also all arranged in a second plurality of straight lines 334 that are perpendicular to that axis. All the discharge openings 336 in perpendicular line 334 at the bottom of FIG. 13, and in alternate lines above in the Figure, are for water, and all the discharge openings 338 in the other perpendicular lines 334 are for air. All discharge openings in any given longitudinal line 330 are alternately for one fluid and then the other.

Each longitudinal line 330 of discharge openings is laterally spaced from the immediately adjacent line of openings on either side of it by a distance 340 that is substantially equal to a first predetermined dimension $d_1$ selected by the designer of the module. The successive openings in a given line 330 are spaced from the immediately adjacent openings in either longitudinal direction along that line by a distance 342 that is substantially equal to a second predetermined dimension $d_2$. Each perpendicular line 334 is spaced from the immediately adjacent line 334 in either longitudinal direction along the module by a distance 344 that is substantially equal to a third predetermined dimension $d_3$. Successive openings in a given line 334 are spaced from the immediately adjacent openings in either lateral direction along the line by a distance 346 that is substantially equal to a fourth predetermined dimension $d_4$.

In the underdrain module of FIG. 13, first predetermined dimension $d_1$ is substantially twice third predetermined dimension $d_3$. Second predetermined dimension $d_2$ is substantially one-half fourth predetermined dimension $d_4$. Again, as with the module of FIG. 5A, these dimensions for predetermined dimensions $d_1$, $d_2$, $d_3$ and $d_4$ produce a good degree of uniformity of distribution of washing water and scouring air.

With the same results as with the embodiment of FIG. 5A, the last discharge openings at bottom end 350 of module 332 (both of which discharge openings are water discharge openings 336' in this embodiment) are longitudinally spaced from the bottom end by a distance 352 that is substantially equal to one-half second predetermined dimension $d_2$. Each discharge opening 336 or 338 that is adjacent the right- or left-hand side of module 302 is laterally spaced from' the side of the module by a distance 354 that is substantially equal to one-half first predetermined dimension $d_1$.

In the embodiment illustrated in FIG. 14, all the discharge openings in any given longitudinal line of openings 360 in the top walls of the two modules 362 are for the same fluid, either water or air, and the same is true of all the discharge openings in any given perpendicular line of openings 364.

Each longitudinal line 360 of discharge openings is laterally spaced from the immediately adjacent line of openings on either side of it by a distance 370 that is substantially equal to a first predetermined dimension $d_1$. The successive openings (whether water discharge openings 366 or air discharge openings 368) in a given line 360 are longitudinally spaced from the immediately adjacent openings in either direction along that line by a distance 372 that is substantially equal to a second predetermined dimension $d_2$.

Each perpendicular line 364 is spaced from the immediately adjacent line 364 in either direction along the longitudinal axis of the module by a distance 374 that is substantially equal to a third predetermined dimension $d_3$. Successive openings in a given line 364 are laterally spaced from the immediately adjacent openings in either direction along the line by a distance 376 that is substantially equal to a fourth predetermined dimension $d_4$.

In the underdrain module of FIG. 14, predetermined dimension $d_1$ is substantially equal to third predetermined dimension $d_3$, and second predetermined dimension $d_2$ is substantially equal to fourth predetermined dimension $d_4$. This distribution of water and air discharge openings across the surface of the underdrain system is a preferred pattern of distribution, and produces a very high degree of uniformity of distribution of washing water and scouring air.

The last discharge openings 368' at bottom ends 380 of modules 362 are longitudinally spaced from the bottom ends by a distance 382 that is substantially equal to one-quarter of second predetermined dimension $d_2$. Each discharge opening 366 or 368 that is next to the right- or left-hand side of a module 362 is laterally spaced from the side of the module by a distance 384 that is substantially equal to one-half of first predetermined dimension $d_1$. Because of this relationship, when two underdrain modules 362 of the same type are arranged side-by-side and in direct contact with each other, as in FIG. 14, the lateral distance between adjacent lines of discharge openings 360 on two side-by-side modules 362 (measured across the abutting edges of the two modules) will be substantially equal to distance 370 ($d_1$) that separates successive discharge openings in each perpendicular line 374 that extends across the top walls of the separate modules.

FIG. 15 represents a portion of FIG. 12. It illustrates how the presence of a layer of grout between side-by-side underdrain modules in an assembled underdrain system affects the positioning of the longitudinal lines of openings that are immediately adjacent to one side or the other of a module. Distance 400 on the right-hand side of FIG. 15, between one longitudinal line of water discharge openings 252 and an adjacent line of air discharge openings 248 in the same module is the same as distance 370 ($d_1$) in FIG. 14. Because of the special relationship between distances 402 and 404 on the left-hand side of FIG. 14 with respect to the thickness 406 of grout layer 246', the spacing 400' between water discharge opening 252 and air discharge opening 248 on the left-hand side of FIG. 15 is the same as spacing 400 between the corresponding discharge openings on the right-hand side of the Figure. Distance 402 is the spacing of longitudinal line of water discharge openings 252 from the right-hand edge of module 240 at the extreme left-hand side of FIG. 15. Distance 404 is the spacing of air discharge openings 248 from the left-hand edge of module 240 that is in the middle of FIG. 15. Distances 406 and 408 are each equal to one-half of grout layer thickness 410. Distances 402, 404, 406 and 408 together make up distance 400' between the immediately adjacent longitudinal lines of discharge openings on the side-by-side modules.

By comparing FIGS. 14 and 15, it will be seen that each discharge opening 248 or 252 that is adjacent one of the sides of the two modules on the left-hand side of FIG. 15 is laterally spaced from its respective module side by a distance substantially equal to (1) one-half first predetermined dimension $d_1$ (distance 384) in FIG. 14, minus (2) one-half the distance by which each of the modules that are assembled side-by-side is spaced from its adjacent module because of thickness of the layer of grout. This one-half of the grout layer thickness is either distance 406 or 408. The same is of course true at the right hand side of FIG. 15.

In FIG. 14 each module is designed to directly contact the adjacent modules in an assembled underdrain system. There is thus no grout layer thickness to be considered. From this it follows that each longitudinal line of discharge openings 360 that is next to a module edge in FIG. 14 is spaced from that edge by substantially one-half of distance 400. In other words, part (2) of the formula stated above is in any such case inoperative. The subtraction identified as part (2) of the stated formula is important, however, in any underdrain system (such as shown in FIGS. 10–12 and 15), in which each underdrain module in an assembled system in fact is separated from adjacent modules on both sides by a layer of grout.

In the embodiment illustrated in FIG. 16, the discharge openings in every line of openings, whether a longitudinal or a perpendicular line, are alternately for one fluid and then the other. Each longitudinal line 420 of discharge openings in the top wall of an underdrain module 422 is laterally spaced from the immediately adjacent line of openings on either side of it by a distance 424 that is substantially equal to a first predetermined dimension $d_1$ selected by the designer of the module the successive openings (whether water discharge openings 426 or air discharge openings 428) in a given line 420 are longitudinally spaced from the immediately adjacent openings in either direction along that line by a distance 430 that is substantially equal to a second predetermined dimension $d_2$.

Each perpendicular line 432 is spaced from the immediately adjacent line 432 in either direction along the longitudinal axis of the module by a distance 434 that is substantially equal to a third predetermined dimension $d_3$. Successive openings in a given perpendicular line 432 are spaced from the immediately adjacent openings in either lateral direction along the line by a distance 436 that is substantially equal to a fourth predetermined dimension $d_4$.

In the module of FIG. 16, first, second, third and fourth predetermined dimensions $d_1$, $d_2$, $d_3$ and $d_4$ are all substantially equal. Like the embodiment of FIGS. 10–12 and 14, this pattern of discharge openings will produce a very high degree of uniformity of distribution of washing water and scouring air across the surface of the underdrain system.

As with several of the other embodiments that have been described, the last discharge openings 426' and 428' at bottom end 438 of modules 422 are longitudinally spaced from the bottom end by a distance 440 that is substantially equal to one-half of second predetermined dimension $d_2$. Each discharge opening 426 or 428 that is next to the right- or left-hand side of a module 422 is laterally spaced from the side of the module by a distance 442 that is substantially equal to one-half first predetermined dimension $d_1$.

The foregoing discussion of various patterns of distribution of water and air discharge openings across the top wall of the underdrain module of this invention demonstrates the great flexibility in the design of extremely effective underdrain systems that this invention provides.

While this invention has been described in connection with the best mode presently contemplated by the inventor for carrying out his invention, the preferred embodiments described and shown are for purposes of illustration only, and are not to be construed as constituting any limitation of the invention. Modifications will be obvious to those skilled in the art, and all modifications that do not depart from the spirit of the invention are intended to be included within the scope of the appended claims.

I claim:

1. A filter underdrain module for use in an underdrain system that is positioned below a filter bed which has at least one layer of granular filter media that removes particulate matter and other contaminants from a liquid that passes through the filter, and requires periodic cleaning by backwashing with water and scouring with air, which filter underdrain module comprises:

(a) an elongated, integrally constructed, self-contained unit having an enclosed interior and having a substantially flat, substantially rectangular exterior top wall, said flat top wall of the module defining two separate sets of discharge openings, one set for water and the other set for air, through which streams of washing water and streams of scouring air, respectively, can pass separately from said enclosed interior at the same time without any mixing of the two fluids, all said discharge openings being located in said flat top wall between the exterior side walls of the module and spaced therefrom, the exterior walls of the module further defining a first inlet opening for introducing water under pressure at a first rate of flow into the enclosed interior of the module, and a second inlet opening, which is completely separate from said first inlet opening, for introducing air under pressure at a second rate of flow into the enclosed interior of the module; and (b) two separate, enclosed conduits located within, and integrally constructed with, the underdrain module, one conduit solely for water and one solely for air, said separate, enclosed conduits being operatively connected from the inlet openings for water and for air to the respective sets of discharge openings for water and for air, to convey water and air separately from said inlet openings for water and air to the respective separate sets of discharge openings for water and for air, whereby no intermixing of water and air can occur within the underdrain module itself during cleaning of the filter media by backwashing with water and scouring with air, whether the washing and scouring are done sequentially or simultaneously, and since the streams of water and streams of air exit separately out of their respective separate sets of discharge openings in the top wall of the module, even in simultaneous washing and scouring the intermixing of streams of water and streams of air outside the module before both streams have come into contact with the filter media is minimized or entirely avoided.

2. The filter underdrain module of claim 1 in which the discharge openings for water are all substantially the same shape and size, and are located in the top wall of the module at positions such that in a plurality of said modules assembled side-by-side in a filter underdrain system, all at substantially the same predetermined distance from each other, said discharge openings for water are substantially uniformly spaced laterally across the top walls of all the assembled elongated modules.

3. The filter underdrain module of claim 1 in which the discharge openings for air in the top wall of the module are all substantially the same shape and size, and are substantially uniformly spaced along the length of the elongated module.

4. The filter underdrain module of claim 1 in which the discharge openings for air are all substantially the same shape and size, and are located in the top wall of the module at positions such that in a plurality of said modules positioned side-by-side in a filter underdrain system, all at substantially the same predetermined distance from each other, said discharge openings for air are substantially uniformly spaced laterally across the top walls of all the assembled elongated modules.

5. The filter underdrain module of claim 1 in which at least one of said conduits for separately conveying a given fluid contains at least one internal partition to form a plurality of ducts for said given fluid, said at least one internal partition containing at least one opening through which said given fluid can pass from one of said plurality of ducts for said fluid to the other of said ducts.

6. The filter underdrain module of claim 5 in which said at least one internal partition is positioned substantially horizontally.

7. The filter underdrain module of claim 5 in which said at least one internal partition is positioned substantially vertically.

8. The filter underdrain module of claim 5 in which:

(a) the openings in each of said at least one partition defining said plurality of ducts that convey a given fluid are substantially the same shape and size, and (b) all said openings for said given fluid are substantially uniformly spaced along the length of the elongated module.

9. The filter underdrain module of claim 1 in which:

(a) the interior cross section of the module is substantially rectangular;

(b) the discharge openings for water are all substantially the same shape and size, are substantially uniformly spaced along the length of the elongated module and are located in the top wall of the module at positions such that in a plurality of said modules assembled side-by-side in a filter underdrain system, all at substantially the same predetermined distance from each other, the discharge openings for water are substantially uniformly spaced laterally across the top walls of said assembled elongated modules; and (c) the discharge openings for air are all substantially the same shape and size, are substantially uniformly spaced along the length of the elongated module and are located in the top wall of the module at positions such that in a plurality of said modules assembled side-by-side in a filter underdrain system, all at substantially the same predetermined distance from each other, the discharge openings for air are substantially uniformly spaced laterally across the top walls of said assembled elongated modules.

10. The filter underdrain module of claim 9 in which:

(a) at least one of said conduits for separately conveying a given fluid contains at least one internal partition to form a plurality of ducts for said given fluid, said at least one internal partition containing at least one opening through which said given fluid can pass from one of said plurality of ducts for said fluid to another of said ducts; and (b) the openings in each of said at least one partition defining said plurality of ducts that convey a given fluid are all substantially the same shape and size, and are substantially uniformly spaced along the length of the elongated module.

11. The filter underdrain module of claim 1 in which the ratio of the cross-sectional area of the interior of said conduit for conveying washing water and the cross-sectional area of the interior of said conduit for conveying scouring air lies in the range from about 1.5 to about 25.

12. The filter underdrain module of claim 11 in which said ratio falls in the range from about 4 to about 15.

13. The filter underdrain module of claim 1 in which the ratio of the total cross-sectional area of all said discharge openings for washing water and the total cross-sectional area of all said discharge openings for scouring air lies in the range from about 10 to about 40.

14. The filter underdrain module of claim 13 in which said ratio falls in the range of about 15 to about 30.

15. The filter underdrain module of claim 1 in which the discharge openings for water in the top wall of the module are all substantially the same shape and size, and are substantially uniformly spaced along the length of the elongated module.

16. The filter underdrain module of claim 1 in which:

(a) all the discharge openings that comprise said two sets of openings in the top wall of the module, one set for wash water and the other set for scouring air, are arranged in a first plurality of straight lines extending parallel to the longitudinal axis of the module, with each of said longitudinal lines of openings being laterally spaced from the immediately adjacent longitudinal line of openings on either side of it by a distance substantially equal to a first predetermined dimension, with the successive openings in each of said first plurality of straight lines of openings being spaced from the immediately adjacent openings in either longitudinal direction along the line of openings by a distance substantially equal to a second predetermined dimension, and with the last discharge openings at each end of the module being longitudinally spaced from the end of the module by a distance substantially equal to one-half said second predetermined dimension, and (b) all the discharge openings that comprise said two sets of openings in the top wall of the module, one set for wash water and the other set for scouring air, are arranged in a second plurality of straight lines that are perpendicular to the longitudinal axis of the module, with each of said perpendicular lines of openings being spaced from the immediately adjacent line of openings in either longitudinal direction along the module by a distance substantially equal to a third predetermined dimension, with the successive openings in each of said second plurality of straight lines of openings being spaced from the immediately adjacent openings in either lateral direction along the line of openings by a distance substantially equal to a fourth predetermined dimension, and with each of the discharge openings that is next to one of the sides of the module being laterally spaced from said module side by a distance substantially equal to (i) one-half said first predetermined dimension minus (ii) one-half the distance by which each module assembled side-by-side in the aforesaid filter underdrain system is spaced from the adjacent module on each side of it.

17. The filter underdrain module of claim 16 in which all the discharge openings in any given longitudinal line of openings are for the same fluid, and the discharge openings in any given perpendicular line are alternately for water and for air.

18. The filter underdrain module of claim 17 in which said first predetermined dimension is substantially one-half said third predetermined dimension, and said second predetermined dimension is substantially twice said fourth predetermined dimension.

19. The filter underdrain module of claim 16 in which the discharge openings in any given longitudinal line of openings are alternately water discharge openings and air discharge openings, and all the discharge openings in any given perpendicular line are for a given fluid.

20. The filter underdrain module of claim 19 in which said first predetermined dimension is substantially twice said third predetermined dimension, and said second predetermined dimension is substantially one-half said fourth predetermined dimension.

21. The filter underdrain module of claim 16 in which a longitudinal line of water discharge openings alternates with a longitudinal line of air discharge openings across the module, and in which a perpendicular line of water discharge openings alternates with a perpendicular line of air discharge openings along the length of the module.

22. The filter underdrain module of claim 21 in which said first and third predetermined dimensions are substantially equal, and said second and fourth predetermined dimensions are each substantially equal to twice said first predetermined dimension.

23. The filter underdrain module of claim 16 in which the discharge openings in any given longitudinal line of openings are alternately water discharge openings and air discharge openings, and the discharge openings in any given perpendicular line of openings are also alternately for water and for air.

24. The filter underdrain module of claim 23 in which said first, second, third and fourth predetermined dimensions are all substantially equal.

25. A filter underdrain system for positioning below a filter bed which has at least one layer of granular filter media that removes particulate matter and other contaminants from a liquid that passes through the filter, and requires periodic cleaning by backwashing with water and scouring with air, said underdrain system supporting the filter media as liquid to be filtered passes through the filter bed, and also as washing liquid and scouring gas are introduced under pressure into the bed during cleaning, which underdrain system comprises:

(a) at least one row of a plurality of elongated, integrally constructed, self-contained modules, the rows in a plurality of rows being assembled side-by-side, each of which modules has an enclosed interior and a substantially flat, substantially rectangular top wall that defines two separate sets of discharge openings, one set for water and the other set for air, through which streams of washing water and streams of scouring air, respectively, can pass separately from said enclosed interior at the same time without any mixing of the two fluids within the enclosed interior, all said discharge openings being located in said flat top wall between said exterior side walls of the module and spaced therefrom, the modules in each of said rows being operatively connected in series, with the downstream end of the last module in the row being closed, the exterior walls of each module further defining a first inlet opening for introducing water under pressure at a first rate of flow into the enclosed interior of the module, and a second inlet opening, which is completely separate from said first inlet opening, for introducing air under pressure at a second rate of flow into the enclosed interior of the module; and (b) two separate enclosed conduits located within, and integrally constructed with, each of said underdrain modules, one conduit solely for water and one solely for air, said separate, enclosed conduits being operatively connected from the inlet openings for water and for air to the respective sets of discharge openings for water and for air, to convey water and air separately from said inlet openings for water and air to the respective separate sets of discharge openings for water and for air, said conduits in the modules being adapted to be operatively connected to sources of water and air, respectively, said modules being further adapted to be positioned below the bottom of the filter media of said filter bed, with all their top exterior walls lying in substantially the same plane, whereby during the filter media cleaning process said underdrain system conveys washing water and scouring air separately with no intermixing of the washing water and scouring air occurring within the modules of the underdrain system itself whether the washing and scouring are done sequentially or simultaneously, and since the streams of water and streams of air exit separately out of their respective separate set of discharge openings in the top walls of the assembled modules, even in simultaneous washing and scouring the intermixing of streams of water and streams of air outside the modules of the underdrain system before both streams have come into contact with the filter media is minimized or entirely avoided.

26. The filter underdrain system of claim 25 in which each of said modules that are assembled side-by-side to form the underdrain system has substantially the same configuration and exterior height.

27. The filter underdrain system of claim 25 in which said discharge openings for water are all substantially the same shape and size, and are substantially uniformly spaced laterally across the top walls of said assembled elongated modules.

28. The filter underdrain system of claim 27 in which the discharge openings for water in the top walls of the assembled modules are substantially uniformly spaced along the length of the top walls of the modules.

29. The filter underdrain system of claim 25 in which said discharge openings for air are all substantially the same shape and size, and are substantially uniformly spaced laterally across the top walls of said assembled elongated modules.

30. The filter underdrain system of claim 29 in which the discharge openings for air in the top walls of the assembled modules are substantially uniformly spaced along the length of the elongated module.

31. The filter underdrain system of claim 25 in which the distance between adjacent filter underdrain modules is no greater than a minor fraction of the width of one of the elongated modules.

32. The filter underdrain system of claim 25 in which the distance between adjacent filter underdrain modules is no greater than about ⅕ of the width of one of the elongated modules.

33. The filter underdrain system of claim 25 in which the distance between adjacent filter underdrain modules is no greater than about ¹⁄₁₀ of the width of one of the elongated modules.

34. The filter underdrain system of claim 25 in which adjacent modules are in substantial contact with each other.

35. The filter underdrain system of claim 25 in which the ratio in each of said modules of the cross-sectional area of the interior of the conduit for conveying washing water and the cross-sectional area of the interior of the conduit for conveying scouring air lies in the range from about 1.5 to about 25.

36. The filter underdrain system of claim 35 in which said ratio for each of the underdrain modules falls in the range from about 4 to about 15.

37. The filter underdrain system of claim 25 in which the ratio for each of said underdrain modules of the total cross-sectional area of all the discharge openings for washing water and the total cross-sectional area of all the discharge openings for scouring air lies in the range from about 10 to about 40.

38. The filter underdrain system of claim 37 in which said ratio falls in the range from about 15 to about 30.

* * * * *